United States Patent
Smahl et al.

[11] Patent Number: 5,983,611
[45] Date of Patent: Nov. 16, 1999

[54] HORSE SHOE CASSETTE SYSTEM

[75] Inventors: Ingvar Alrik Smahl; Ronnie Smahl, both of Tierp, Sweden

[73] Assignee: Elastolan Inc., Lake Oswego, Oreg.

[21] Appl. No.: 09/054,278

[22] Filed: Apr. 2, 1998

[51] Int. Cl.[6] .................................................. A01L 3/00
[52] U.S. Cl. .................................. 54/82; 168/18; 168/23
[58] Field of Search .......................... 54/82; 168/18, 168/23, 2, 3, 27

[56] References Cited

U.S. PATENT DOCUMENTS

| | | | |
|---|---|---|---|
| 349,668 | 9/1886 | John | 168/2 |
| 448,312 | 3/1891 | Barclay | 168/18 |
| 697,791 | 4/1902 | Boumal | 168/18 |
| 1,452,317 | 4/1923 | Simon et al. | 168/18 |
| 2,041,538 | 5/1936 | Gash et al. | 168/4 |
| 2,529,419 | 11/1950 | Quartullo | 168/25 |
| 4,290,487 | 9/1981 | Unger | 168/18 |
| 4,794,991 | 1/1989 | Honderich | 168/26 |
| 4,881,600 | 11/1989 | Nebel | 168/11 |
| 5,209,048 | 5/1993 | Hanson | 54/82 |
| 5,224,549 | 7/1993 | Lightner | 168/18 |
| 5,343,957 | 9/1994 | Chapman | 168/11 |
| 5,600,940 | 2/1997 | Rice | 54/82 |

FOREIGN PATENT DOCUMENTS

| | | | |
|---|---|---|---|
| 251976 | 5/1911 | Germany | 168/18 |
| 2902189 A1 | 7/1980 | Germany | A01L 5/00 |
| 3311383 A1 | 10/1984 | Germany | A01L 3/06 |
| 4135131 A1 | 4/1993 | Germany | A01L 5/00 |
| 1037 | 1/1895 | United Kingdom | 168/18 |

*Primary Examiner*—Robert P. Swiatek
*Assistant Examiner*—Son T. Nguyen
*Attorney, Agent, or Firm*—Fasth Law Offices; Rolf Fasth

[57] ABSTRACT

A horse shoe cassette system for an animal's hoof. The cassette system comprises a plurality of hollow holders that are screwed into the hoof. Each holder has a threaded outside surface and a threaded inside opening defined therein. A flexible covering, of a general hollow ungulate shape to fit an ungulate's hoof, has a bottom plate that includes a first opening defined therein. A horse shoe is attached to the bottom plate of the flexible covering and the horse shoe has a second opening. A threaded screw member extends through the first and second openings and is screwed into the threaded inside opening of the holder disposed in the hoof.

20 Claims, 2 Drawing Sheets

HORSE SHOE CASSETTE SYSTEM

TECHNICAL FIELD

A horse shoe cassette system that provides protection of an injured horse hoof while permitting easy removal and attachment of a horse shoe to the hoof.

BACKGROUND INFORMATION AND SUMMARY OF THE INVENTION

Horse hoofs are sometimes injured for various reasons, and it is often painful for the horse to walk and to have horse shoe nails removed from and attached to the injured hoof. There is also a risk of infection of the injured hoof, particularly if the injury of the hoof is exposed. Another problem is that the horse hoof may be too dry and that, in turn, can cause harm to the hoof.

There is a need for a horse shoe cassette system that would enable the horse to be outside walking, and even trotting, despite an injury to one or many of its hoofs. There is also a need for a fastening mechanism of a horse shoe to the horse hoof without having to rely on horse shoe nails.

Various devices have heretofore been provided to be worn by hoofed animals such as horses, cows, mules, or the like. The prior art devices are attached to the hoofs by means of straps provided with hook or loop fasteners. Such devices have suffered from lack of sufficient protection to prevent water, manure, and other debris from contacting an injured hoof. Other bandages have suffered from lack of sufficient fixation means to hold the same in place when worn by an active animal. Also, the prior art devices are cumbersome to use.

The present invention is a horse shoe cassette system that provides effective protection of an injured hoof while permitting convenient removal and attachment of a horse shoe to the hoof. The cassette system comprises a plurality of hollow holders that are screwed into the hoof. Each holder has a threaded outside surface and a threaded inside opening defined therein. A flexible covering, of a general hollow ungulate shape to fit an ungulate's hoof, has a bottom plate that includes a first opening. A horse shoe may be attached to the bottom plate of the flexible covering, and the horse shoe may have second opening defined therein. A threaded screw member extends through the first and second openings and may be screwed into the threaded inside opening of the holder disposed in the hoof to tightly hold the horse shoe to the flexible covering and the bottom of the hoof.

DETAILED DESCRIPTION

Figure 1:
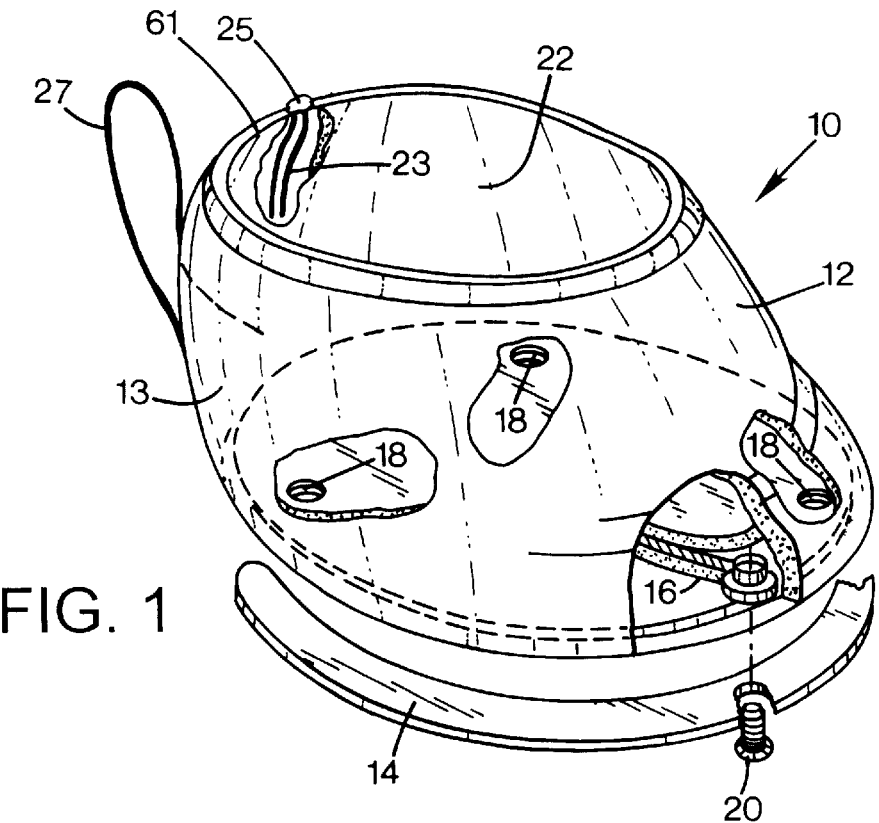
FIG. 1 is a perspective view of the horse shoe cassette system of the present invention.

With reference to FIGS. 1–4, the horse shoe cassette system 10 of the present invention preferably includes a flexible hoof protector 12 that may have a horse shoe 14 attached thereto. It is to be understood that the cassette system of the present invention is not limited to be used for horses, and may be used for other ungulate such as cows, mules, donkeys, etc. The cassette system 10 enhances healing and protects injuries of a hoof 15 or coronet of a horse while permitting the horse to walk or trot during the healing process. The cassette system 10 is also useful to protect healthy hoofs. The hoof 15 may have a plurality of holes defined therein to receive threaded holders. A threaded holder 17 preferably is hollow so that the holder is threaded on both an outside surface 6 and on an inside surface 8. In this way, the holder 17 may be screwed into the hoof 15 by turning the holder 17 so that the threaded outside surface 6 may engage the hoof 15. The holders 17 are firmly secured to the bottom of the hoof 15 and can conveniently be removed by unscrewing the holders from the bottom of the hoof. Preferably, the hoof 15 has about six threaded holders 17 screwed into the bottom of the hoof 15. The primary function of the holders 17 is to tightly hold a horse shoe and other devices against the bottom of the hoof 15. The upper end of the holder 17 may have a cavity defined therein so that it can be easily removed by a conventional screw driver.

In the preferred embodiment, the hoof protector 12 is a flexible shoe that is dimensioned to snugly fit over a healthy or an injured horse hoof. The hoof protector 12 may have a flexible side wall 13 and a sturdy bottom plate 16 having an under surface 28. A plurality of holes 18 are preferably distributed evenly on the bottom plate 16 to receive main bolts 20 that may extend through the holes 18 and be screwed into the holders 17 of the horse hoof 15. The holes 18 are preferably placed on the bottom plate 16 so that they align with the threaded holes of the holders 17. The bottom plate 16 may include a stiff support plate 9 to provide further support of the hoof 15. The support plate 9 preferably extends along the whole length of the bottom plate 16.

The hoof protector 12 has an upper rim portion 61 defining an upwardly facing opening 22 that is dimensioned to receive the hoof 15. A front end 24 of the hoof protector 12 has a backwardly sloping profile relative to the bottom plate 16 and a back and 26 includes a cavity that is shaped to snugly fit over the bulb of the hoof 15. A strap 27 may be attached to the back and 26 to make it easier to pull the hoof protector 12 onto the hoof 15. The hoof protector 12 is preferably made of a flexible material such as polyurethane or any other flexible polymeric or non-polymeric material. A plurality of reflectors 21 may be attached to the outside of the side wall 13 of the hoof protector 12. Also, the hoof protector 12 may be colored in a wide variety of bright colors.

A channel 23 is defined at the back end 26 that is in operative engagement with a valve 25. By injecting air into the channel 23 under high pressure via the valve 25, the hoof protector 12 may be partially inflated to make it easier to remove the hoof protector 12 from the hoof 15 due to less contact and friction between the hoof protector 12 and the hoof 15. The channel 23 may also be used to moisturize the hoof 15 by injecting water into the hoof protector 12.

Figure 4:
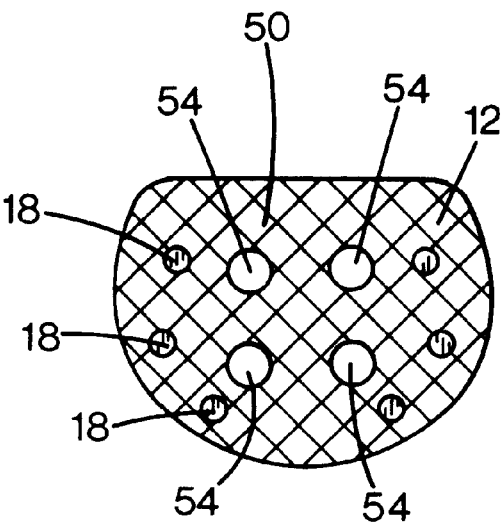
FIG. 4 is a bottom view of a horse protector of the present inventor.

As beat shown in FIG. 4, the hoof protector 12 may have a durable bottom surface 50 that has a slip resistant pattern so that the horse may safely walk with the hoof protector 12 mounted on the hoofs without slipping. The bottom surface 50 may also have studs 54 formed therein that protrude outwardly from the bottom surface 50 to further reduce the risk of slipping.

Figure 2:
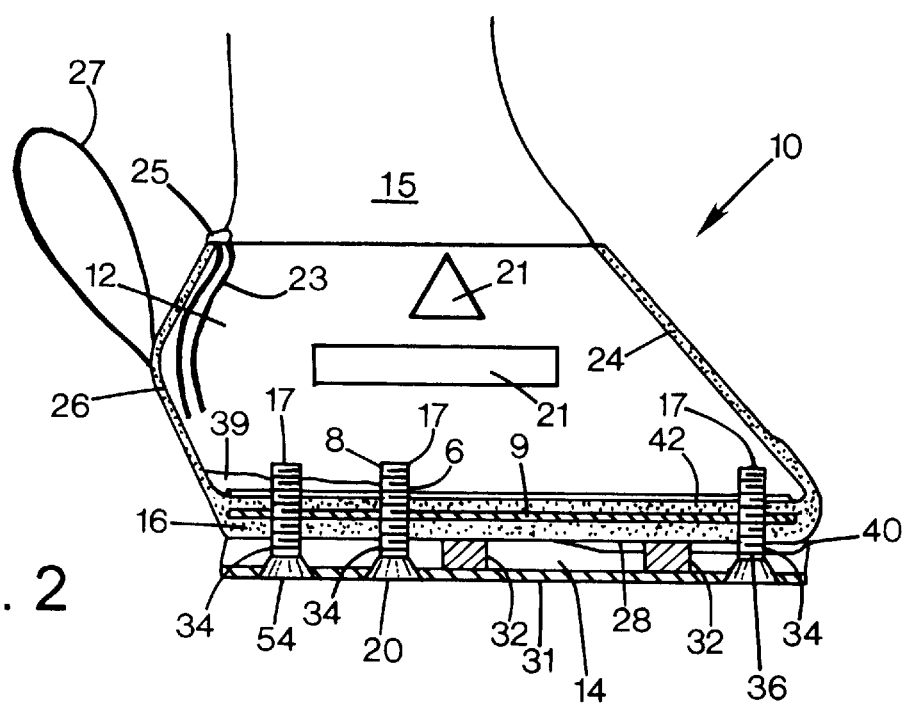
FIG. 2 is a side view of the horse shoe cassette system of FIG. 1.

As best seen in FIG. 2, the horse shoe 14 is preferably attached to the bottom plate 16 of the hoof protector 12 by the bolts 20. The horse shoe 14 may be made of a metal or any other suitable material that is durable and provides good wear resistance such as a carbon fiber composite material.

For example, the horse shoe 14 may be made of Alumec 79 that is about three millimeters thick. In the preferred embodiment, the horse shoe 14 may be coated with a polymeric material such as a polyurethane coating 31.

Figure 3:
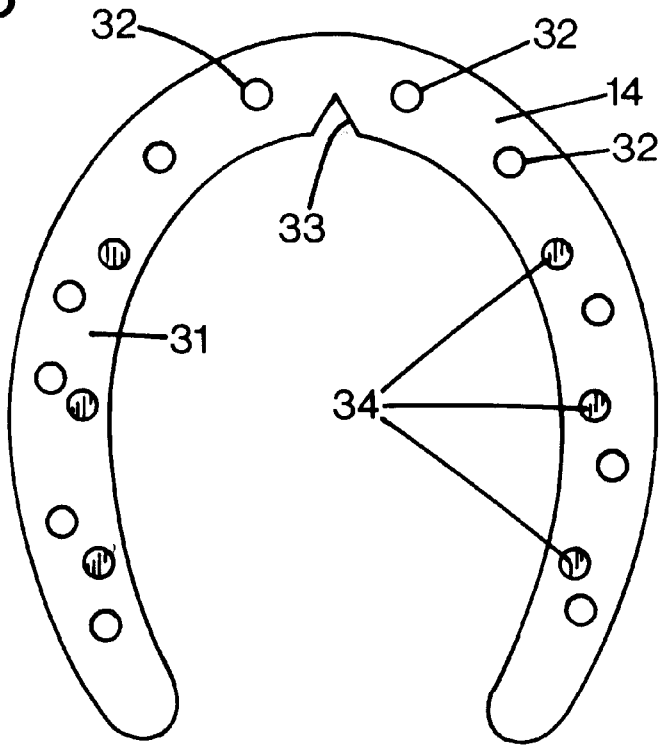
FIG. 3 is a top view of a horse shoe of the present invention.

As best seen in FIG. 3, the horse shoe 14 defines a plurality of openings 32 and chamfered openings 34. The opening 32 are preferably larger than the openings 34 that are designed to accommodate the bolts 20. The openings 34 preferably have chamfered upper ends so that the bolts 20 are flush with the bottom of the horse shoe 14. The bolts 20 may also extend beyond the surface of the horse shoe 14 and function as a stud 54. Because the bolts 20 are threadedly attached to the holders 17, the horse shoe 14 may conveniently be removed by unscrewing the bolts 20 without having to withdraw nails from the hoof 15.

Threaded weights 36 may be screwed into the holder 17, instead of the bolts 20, so as to balance the horse shoe 14 to make sure the trot of a horse is smooth. If the horse shoe 14 is not properly balanced, then the weight distribution of the horse shoe 14 may easily be modified by adding or removing the threaded weights 36 from the horse shoe 14. The weights 36 may have the same shape as the bolts 20 but are preferably heavier or lighter than the bolts 20. The convenience of being able to screw or unscrew the bolts 20 and weights 36 from the hoof 15 is particularly important if the hoof 15 of the horse is injured because it may be painful to the horse to have conventional nails inserted into and withdrawn from the hoof 15. A front portion of the horse shoe may include an adjustment cavity 33 to make sure that the horse shoe 14 is properly placed on the hoof 15 before the bolts 20 or weights 36 are screwed into the holders 17 and tightened.

The polyurethane coating 31 may penetrate the openings 32 of the horse shoe 14 to provide extra cushioning of the horse shoe 14. The penetration of the coating 31 also ensures that the coating is not easily pulled off from the horse shoe 14. It is also possible to add a plate 40 between the bottom plate 16 of the hoof protector 12 and the horse shoe 14 if it is necessary to adjust the thickness of the horse shoe to ensure proper walking or trotting of the horse.

An added feature of the present invention is that extra cushions or plastic foam 42 may be placed inside the hoof protector 12 between the bottom plate 16 and the hoof 15. Also, the plastic foam 42 may be impregnated with a medicament or other substance that is suitable to aid in the healing process of the hoof 15. The hoof protector 12 may also contain inlays 39, disposed between the hoof 15 and the bottom plate 16, that may be used to adjust the horizontal position of the hoof 15 relative to the bottom plate 16. The inlays 39 are particularly important if the hoof 15 is injured and it is not possible to adjust or cut the hoof edges.

While the present invention has been described in accordance with preferred compositions and embodiments, it is to be understood that certain substitutions and alterations may be made thereto without departing from the spirit and scope of the following claims.

We claim:

1. A horse shoe cassette system for an animal's hoof comprising:
   a holder for screwing the hoof, the holder having a threaded outside surface and a threaded inside opening defined therein;
   a flexible covering of a general hollow ungulate shape to fit an ungulate's hoof, the flexible covering having a bottom plate defining a first opening;
   a horse shoe attached to the bottom plate of the flexible covering, the horse shoe having a second opening defined therein, the second opening being alignable with the first opening of the flexible covering; and
   a threaded screw member extending through the first and second openings and screwed into the threaded inside opening of the holder for disposition in the hoof.

2. The horse shoe cassette system according to claim 1 wherein the horse shoe has a third opening defined therein, the third opening has a third diameter that is greater than a second diameter of the second opening, the horse shoe has a bottom surface that is coated with a polymeric material so that a portion of the polymeric material penetrates the third opening.

3. The horse shoe cassette system according to claim 1 wherein the horse shoe cassette system further comprises a threaded weight member that is screwed into the first and second openings, the weight member has a weight that is greater than a weight of the threaded screw member to balance a weight distribution of the horse shoe cassette system.

4. The horse shoe cassette system according to claim 1 wherein the flexible covering is made of a flexible polyurethane material.

5. The horse shoe cassette system according to claim 1 wherein the flexible covering has a back portion with an upper rim member, the back portion has a channel defined therein that extends from the rim member towards a bottom portion of the flexible covering.

6. The horse shoe cassette system according to claim 5 wherein the flexible covering has a valve in operative engagement with the channel.

7. The horse shoe cassette system according to claim 1 wherein the threaded screw member has a stud extension attached thereto that extends beyond a bottom surface of the flexible covering.

8. The horse shoe cassette system according to claim 1 wherein the flexible covering has a plurality of reflectors attached thereto.

9. The horse shoe cassette system according to claim 1 wherein a first weight bolt, having a first weight, is inserted through the horse shoe and the flexible covering into a first holder disposed inside the hoof, a second weight bolt, having a second weight, is inserted through the horse shoe and the flexible covering into a second holder disposed inside the hoof, the first weight bolt is spaced apart from the second weight bolt and the first weight is different from the second weight.

10. A horse shoe cassette system to be attached to a bottom portion of a horse hoof comprising:
    a plurality of elongate hollow holders for screwing into the bottom portion of the hoof, each holder having a threaded outside surface and a threaded inside opening defined therein;
    a horse shoe attachable to the bottom portion of the hoof, the horse shoe having a plurality of horse shoe openings defined therein, the horse shoe openings being alignable with the threaded inside openings of the elongate hollow holders disposed inside the hoof;
    a first threaded screw member having a first weight, the first screw member extending through one of the horse shoe openings and into one of the threaded inside openings of the holders disposed in the hoof to for tightly holding the horse shoe to the bottom portion of the hoof; and
    a second threaded screw member having a second weight, the second screw member extending through one of the horse shoe openings into one of the threaded inside openings of the holders for tightly holding the horse shoe to the bottom portion of the hoof, the first weight being different from the second weight to balance a weight distribution of the horse shoe.

11. The horse shoe cassette system according to claim 10 wherein the horse shoe has a large opening defined therein, the large opening being greater than the horse shoe openings, the horse shoe having a bottom surface that is coated with a polyurethane material so that a portion of the polyurethane material covers the bottom surface of the horse shoe and penetrates into the large opening.

12. The horse shoe cassette system according to claim 10 wherein the horse shoe cassette system further comprise a flexible hoof protector that has a hollow ungulate shape to tightly fit over the hoof.

13. The horse shoe cassette system according to claim 12 wherein an inlay is disposed between the hoof and the hoof protector, the inlay has an uneven thickness.

14. The horse shoe cassette system according to claim 12 wherein a plate is disposed between the bottom plate of the hoof protector and the horse shoe, the plate has an uneven thickness.

15. The horse shoe cassette system according to claim 12 wherein the horse shoe is attached to a bottom surface of the hoof protector.

16. The horse shoe cassette system according to claim 15 wherein the hoof protector has a back portion, the back portion has a substantially vertical channel defined therein that extends towards the bottom surface of the hoof protector.

17. The horse shoe cassette system according to claim 16 wherein the hoof protector has a valve in operative engagement with the channel to permit injection of a fluid into the channel.

18. The horse shoe cassette system according to claim 15 wherein the first threaded screw member has a stud extension attached thereto that extends beyond the bottom surface of the hoof protector.

19. A method of protecting an injured horse hoof, comprising the steps of:

defining a plurality of openings in the hoof;

screwing a threaded holder into the opening of the hoof, the threaded holder having a threaded opening defined therein;

placing the hoot inside a flexible hoof protector having a bottom plate, the flexible hoof protector defining a first opening;

attaching a horse shoe to the bottom plate, the horse shoe defining a second opening;

aligning the threaded opening with the first and second openings;

inserting a threaded screw through the first and second openings; and screwing the threaded screw into the threaded opening to tightly hold the horse shoe to the bottom plate of the flexible hoof protector.

20. The method according to claim 19 wherein the method further comprises the step of screwing in a threaded weight screw into threaded opening to balance the horse shoe.

* * * * *